April 4, 1933.  L. A. ROGERS  1,903,344
VALVE
Filed Oct. 10, 1931

Lore A. Rogers, Inventor

By [signature], Attorney

Patented Apr. 4, 1933

1,903,344

UNITED STATES PATENT OFFICE

LORE A. ROGERS, OF WASHINGTON, DISTRICT OF COLUMBIA, DEDICATED TO THE FREE USE OF THE PUBLIC

VALVE

Application filed October 10, 1931. Serial No. 568,159.

(GRANTED UNDER THE ACT OF MARCH 3, 1883, AS AMENDED APRIL 30, 1928; 370 O. G. 757)

This application is made under the act approved April 30, 1928 and the invention herein described may be manufactured and used by or for the Government for governmental purposes without payment to me of any royalty thereon.

I hereby dedicate the invention herein described to the free use of the public, to take effect upon granting of a patent to me.

In the normal ripening of cheese considerable quantities of gas, chiefly carbon dioxide, are evolved. If the cheese is sealed in cans or glass jars without processing or other treatment to interfere with the normal ripening sufficient gas will be produced to lower the oxygen tension to a point at which molds can not grow. This serves a useful purpose in keeping the surface of the cheese free from growth which injures its appearance and flavor, but as the evolution of gas continues a pressure is developed which will in time be sufficient to cause swelling and sometimes even bursting of the can. This fact has prevented the canning of cheese except by methods which include heating and a material change in the flavor and texture of the product.

The advantage of a method by which the cheese can be sealed in the can as it comes from the press is so obvious that I have devised a valve which will exclude air from the can so that molds can not grow and will at the same time permit the escape of gas from the can so that sufficient pressure to cause swelling can not accumulate. This valve is an adaptation and improvement of the well known Bunsen valve generally used in laboratories to permit the flow of gas through a tube in one direction only.

As ordinarily used the Bunsen valve is made by cutting a straight slit or V shaped flap in a short piece of rubber tubing connected at one end with the tube through which the gas flows. The opposite end of the rubber tube is closed. Pressure of gas on the inside of the tube tends to open the slit and permit the gas to flow while pressure on the outside tends to close it and prevent the inward flow of the gas. Obviously this form of the valve is not adapted to use on cans because of its unwieldy form and because it can not be depended upon to close absolutely tight.

Figure 2:
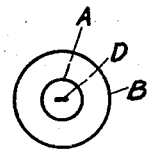
Figure 1:
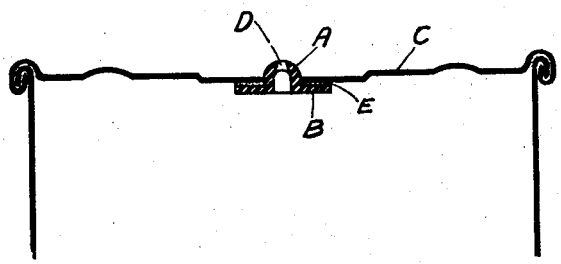

The valve I have devised is shown in cross section in Figure 1 and in plan in Figure 2. It consists of a dome-shaped nipple A of pliable rubber to which is attached an annular collar B. In the center of the disk A is a V-shaped slit D with its apex to the outer or convex side of the dome D. Dome D projects through an annular opening in the top of the can C to which the collar B is hermetically sealed at E. The shape of the valve is such that in the absence of positive pressure in the can the opening remains closed while any appreciable pressure causes it to open, permitting the escape of gas until the pressure is equalized. In practice it would probably be advisable to provide a loose metallic disk to protect the valve from the contents of the can but this is not an essential part of the device.

Having described my invention I claim:

1. A one-way valve comprising a dome-shaped nipple projecting through an annular opening formed in a container and consisting of pliable rubber having a V-shaped slit with its apex on the convex side of said dome, and its opposite end opening into the interior of the container, said dome-shaped nipple having an annular collar affixed to said container.

2. A one-way valve consisting of a dome-shaped nipple of pliable rubber having a V-shaped slit with its apex on the convex side of said dome, said dome-shaped nipple having an annular collar affixed to the container with the convex side of the nipple situated on the outside of the container.

LORE A. ROGERS.